(12) United States Patent
Wang et al.

(10) Patent No.: US 12,524,902 B2
(45) Date of Patent: Jan. 13, 2026

(54) SYSTEMS AND METHODS FOR DETECTING SUPPORT MEMBERS OF PRODUCT STORAGE STRUCTURES AT PRODUCT STORAGE FACILITIES

(71) Applicant: Walmart Apollo, LLC, Bentonville, AR (US)

(72) Inventors: Wei Wang, Dallas, TX (US); Lingfeng Zhang, Dallas, TX (US); Han Zhang, Allen, TX (US); Avinash M. Jade, Bangalore (IN); Mingquan Yuan, Flower Mound, TX (US); Zhaoliang Duan, Frisco, TX (US); Siddhartha Chakraborty, Kolkata (IN); Benjamin R. Ellison, San Francisco, CA (US); William Craig Robinson, Jr., Centerton, AR (US); Eric W. Rader, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 418 days.

(21) Appl. No.: 18/103,338

(22) Filed: Jan. 30, 2023

(65) Prior Publication Data
US 2024/0257380 A1 Aug. 1, 2024

(51) Int. Cl.
*G06T 7/70* (2017.01)
*B25J 5/00* (2006.01)
(Continued)

(52) U.S. Cl.
CPC .............. *G06T 7/70* (2017.01); *B25J 5/007* (2013.01); *G06T 7/90* (2017.01); *G06V 10/16* (2022.01);
(Continued)

(58) Field of Classification Search
CPC ... G06T 7/70; G06T 7/90; G06T 2207/10024; B25J 5/007; G06V 10/16; G06V 10/56;
(Continued)

(56) References Cited

U.S. PATENT DOCUMENTS 5,074,594 A 12/1991 Laganowski
6,570,492 B1 5/2003 Peratoner
(Continued)

FOREIGN PATENT DOCUMENTS

CN 108509879 A * 9/2018 .......... G06F 18/2411
CN 106347550 B 8/2019
(Continued)

OTHER PUBLICATIONS

Wu, K., Otoo, E., & Suzuki, K. (2008). Two Strategies to Speed up Connected Component Labeling Algorithms. Lawrence Berkeley National Laboratory. Retrieved from https://escholarship.org/uc/item/5pc9s496 (Year: 2008).*

(Continued)

*Primary Examiner* — Aaron W Carter
*Assistant Examiner* — Kyla Guan-Ping Tiao Allen
(74) *Attorney, Agent, or Firm* — Foley IP Law, PLLC

(57) ABSTRACT

Systems and methods of detecting support members of product storage structures that store products at a product storage facility include an image capture device that captures images of a product storage structure including vertical and horizontal support members. A computing device including a control circuit is configured to: obtain the images of the product storage structure captured by the image capture device, stitch the obtained images together to generate a stitched image that depicts the product storage structure, generate a color distribution map of the stitched (Continued)

image of the product storage structure to detect individual ones of the horizontal and vertical support members of the product storage structure.

18 Claims, 10 Drawing Sheets

(51) Int. Cl.
 *G06T 7/90* (2017.01)
 *G06V 10/10* (2022.01)
 *G06V 10/56* (2022.01)
(52) U.S. Cl.
 CPC .... *G06V 10/56* (2022.01); *G06T 2207/10024* (2013.01); *G06V 2201/07* (2022.01)
(58) Field of Classification Search
 CPC .. G06V 2201/07; G06V 20/52; G06Q 10/087; G06N 3/04
 See application file for complete search history.

(56) References Cited

U.S. PATENT DOCUMENTS

| | | |
|---|---|---|
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 | 2/2019 | Pisoni |
| 10,373,116 B2 | 8/2019 | Medina |
| 10,572,757 B2 | 2/2020 | Graham |
| 10,592,854 B2 | 3/2020 | Schwartz |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2011/0040427 A1 | 2/2011 | Ben-Tzvi |
| 2014/0002239 A1 | 1/2014 | Rayner |
| 2014/0247116 A1 | 9/2014 | Davidson |
| 2014/0307938 A1 | 10/2014 | Doi |
| 2015/0363660 A1 | 12/2015 | Vidal |
| 2016/0203525 A1 | 7/2016 | Hara |
| 2017/0106738 A1 | 4/2017 | Gillett |
| 2017/0286773 A1 | 10/2017 | Skaff |
| 2018/0005176 A1 | 1/2018 | Williams |
| 2018/0018788 A1 | 1/2018 | Olmstead |
| 2018/0101813 A1* | 4/2018 | Paat .................... G06Q 10/087 |
| 2018/0108134 A1 | 4/2018 | Venable |
| 2018/0197223 A1 | 7/2018 | Grossman |
| 2018/0260772 A1 | 9/2018 | Chaubard |
| 2019/0025849 A1 | 1/2019 | Dean |
| 2019/0043003 A1 | 2/2019 | Fisher |
| 2019/0050932 A1 | 2/2019 | Dey |
| 2019/0087772 A1 | 3/2019 | Medina |
| 2019/0163698 A1 | 5/2019 | Kwon |
| 2019/0180150 A1* | 6/2019 | Taylor .................. G06V 30/224 |
| 2019/0197561 A1 | 6/2019 | Adato |
| 2019/0220482 A1 | 7/2019 | Crosby |
| 2019/0236531 A1 | 8/2019 | Adato |
| 2020/0118063 A1 | 4/2020 | Fu |
| 2020/0246977 A1 | 8/2020 | Swietojanski |
| 2020/0265494 A1 | 8/2020 | Glaser |
| 2020/0324976 A1 | 10/2020 | Diehr |
| 2020/0356813 A1 | 11/2020 | Sharma |
| 2020/0380226 A1 | 12/2020 | Rodriguez |
| 2020/0387858 A1 | 12/2020 | Hasan |
| 2021/0049541 A1 | 2/2021 | Gong |
| 2021/0049542 A1 | 2/2021 | Dalal |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0272269 A1 | 9/2021 | Suzuki |
| 2021/0319684 A1 | 10/2021 | Ma |
| 2021/0342914 A1 | 11/2021 | Dalal |
| 2021/0400195 A1 | 12/2021 | Adato |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0067976 A1 | 3/2022 | Gershon |
| 2022/0114403 A1 | 4/2022 | Shaw |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0262008 A1 | 8/2022 | Kidd |
| 2022/0284383 A1* | 9/2022 | Chaubard ............. G06T 3/4046 |

FOREIGN PATENT DOCUMENTS

| | | | |
|---|---|---|---|
| CN | 110348439 B | 10/2019 | |
| CN | 111354048 A * | 6/2020 | ............... G06K 9/46 |
| CN | 110443298 B | 2/2022 | |
| CN | 114898358 A | 8/2022 | |
| CN | 119722538 A * | 3/2025 | |
| EP | 3217324 A1 | 9/2017 | |
| EP | 3437031 | 2/2019 | |
| EP | 3479298 | 5/2019 | |
| EP | 3998451 A1 * | 5/2022 | ........... G01C 21/206 |
| KR | 2020093283 A * | 8/2020 | |
| WO | 2006113281 A2 | 10/2006 | |
| WO | 2017201490 A1 | 11/2017 | |
| WO | 2018093796 | 5/2018 | |
| WO | 2020051213 A1 | 3/2020 | |
| WO | 2021186176 A1 | 9/2021 | |
| WO | 2021247420 A2 | 12/2021 | |

OTHER PUBLICATIONS

U.S. Appl. No. 17/963,751, filed Oct. 11, 2022, Yilun Chen.
U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/106,269, filed Feb. 6, 2023, Zhaoliang Duan.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Chaudhuri, Abon et al.; "A Smart System for Selection of Optimal Product Images in E-Commerce"; 2018 IEEE Conference on Big

(56) References Cited

OTHER PUBLICATIONS

Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 1-6.
Kaur, Ramanpreet et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877>; pp. 1-11 pages.
Naver Engineering Team; "Auto-classification of Naver Shopping Product Categories using TensorFlow"; <https://blog.tensorflow.org/2019/05/auto-classification-of-naver-shopping.html>; May 20, 2019; pp. 1-15.
Paolanti, Marine et al.; "Mobile robot for retail surveying and inventory using visual and textual analysis of monocular pictures based on deep learning"; European Conference on Mobile Robots; Sep. 2017, 6 pages.
Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.
Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-10.
Singh, Ankit; "Image Recognition and Object Detection in Retail"; <https://blog.paralleldots.com/featured/image-recognition-and-object-detection-in-retail/>; Sep. 26, 2019; pp. 1-11.
Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.
Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.
Technology Robotix Society; "Colour Detection"; <https://medium.com/image-processing-in-robotics/colour-detection-e15bc03b3f61>; Jul. 2, 2019; pp. 1-6.
Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.
Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.
Verma, Nishchal, et al.; "Object identification for inventory management using convolutional neural network"; IEEE Applied Imagery Pattern Recognition Workshop (AIPR); Oct. 2016, 6 pages.
Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.
Rodriquez, K., PCT International Search Report and Written Opinion, mailed Jun. 6, 2024, in connection with International Application No. PCT/US2024/12311, all pages.

\* cited by examiner

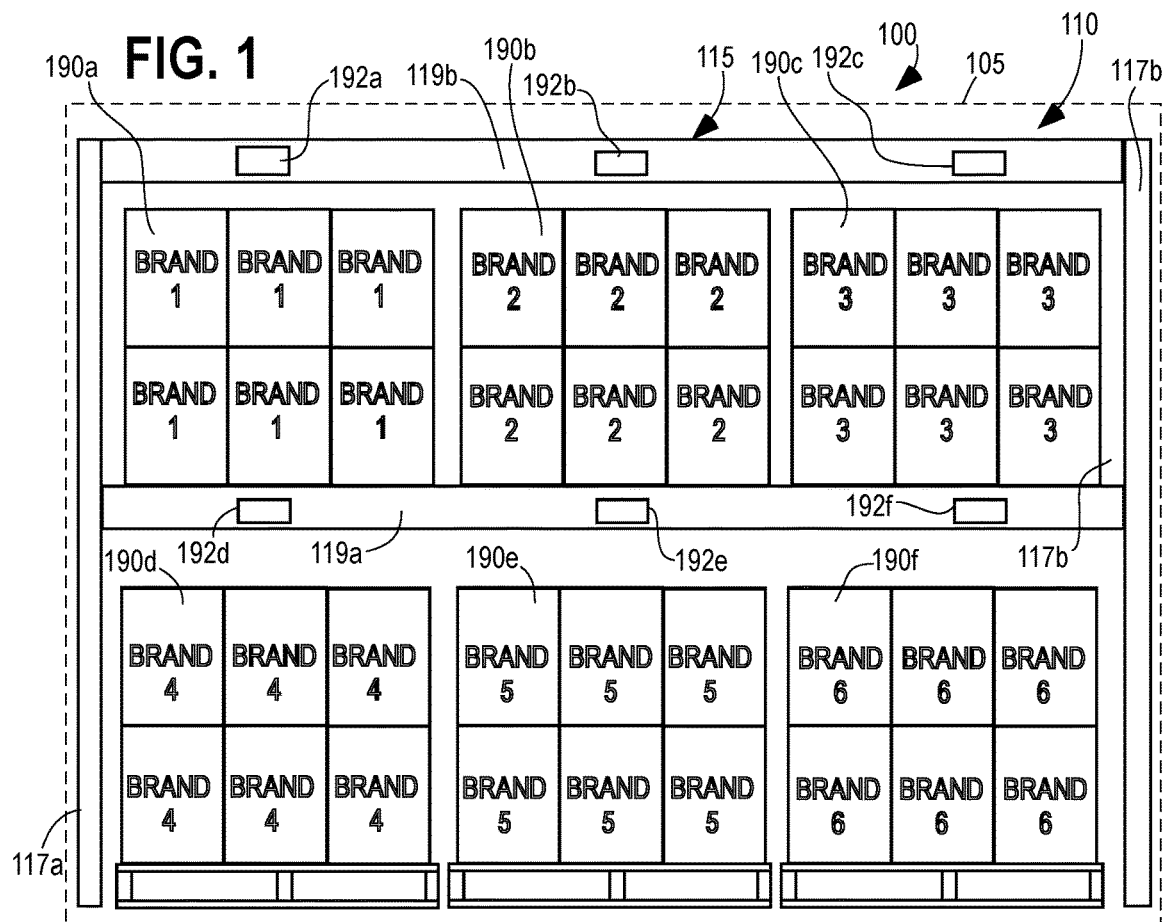
FIG. 1
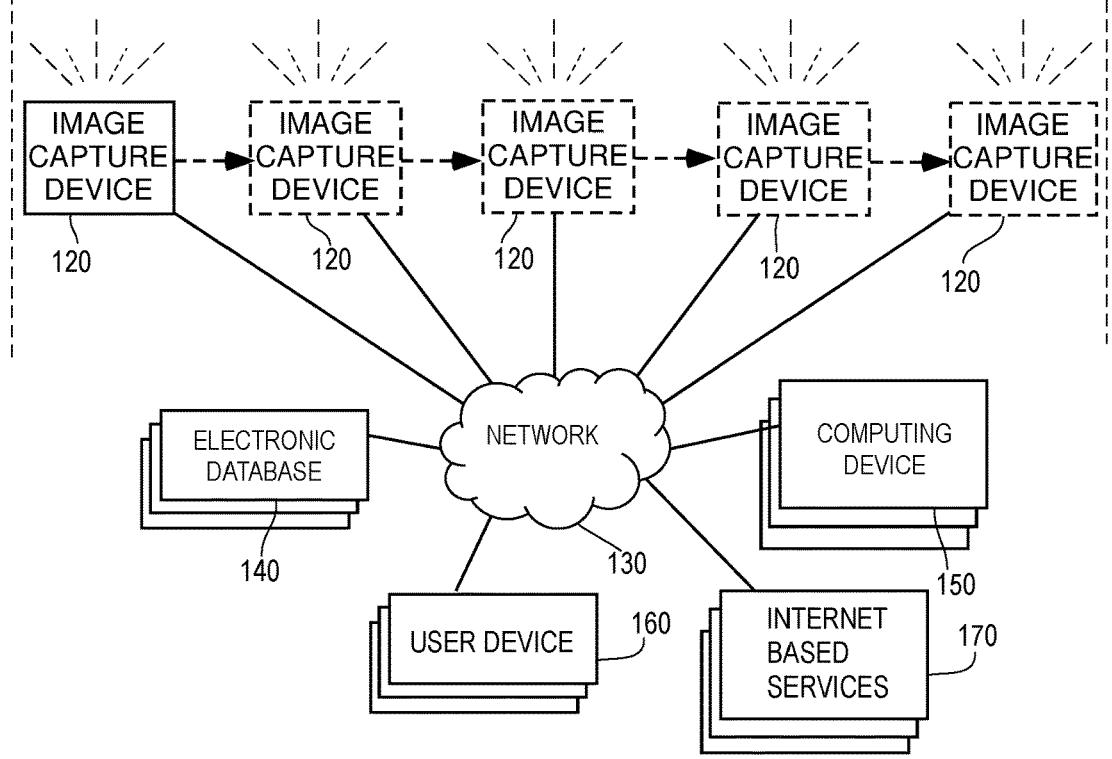

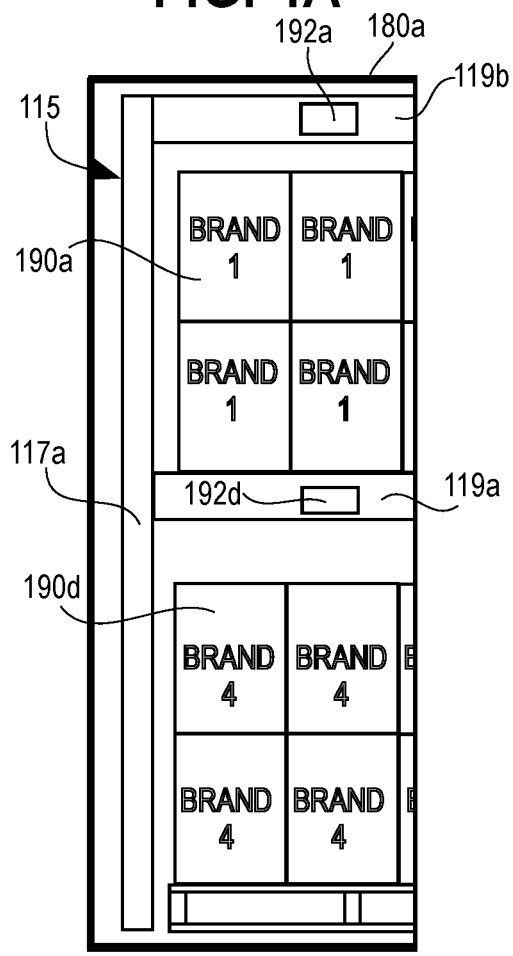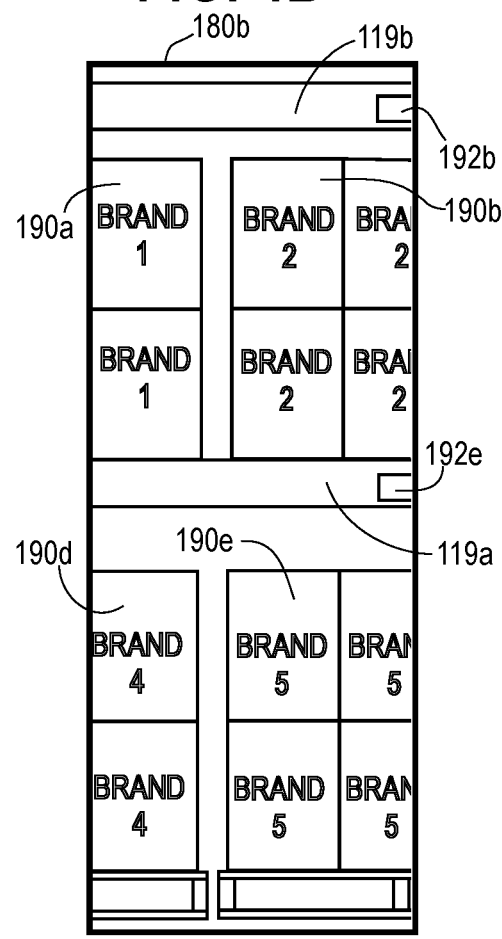

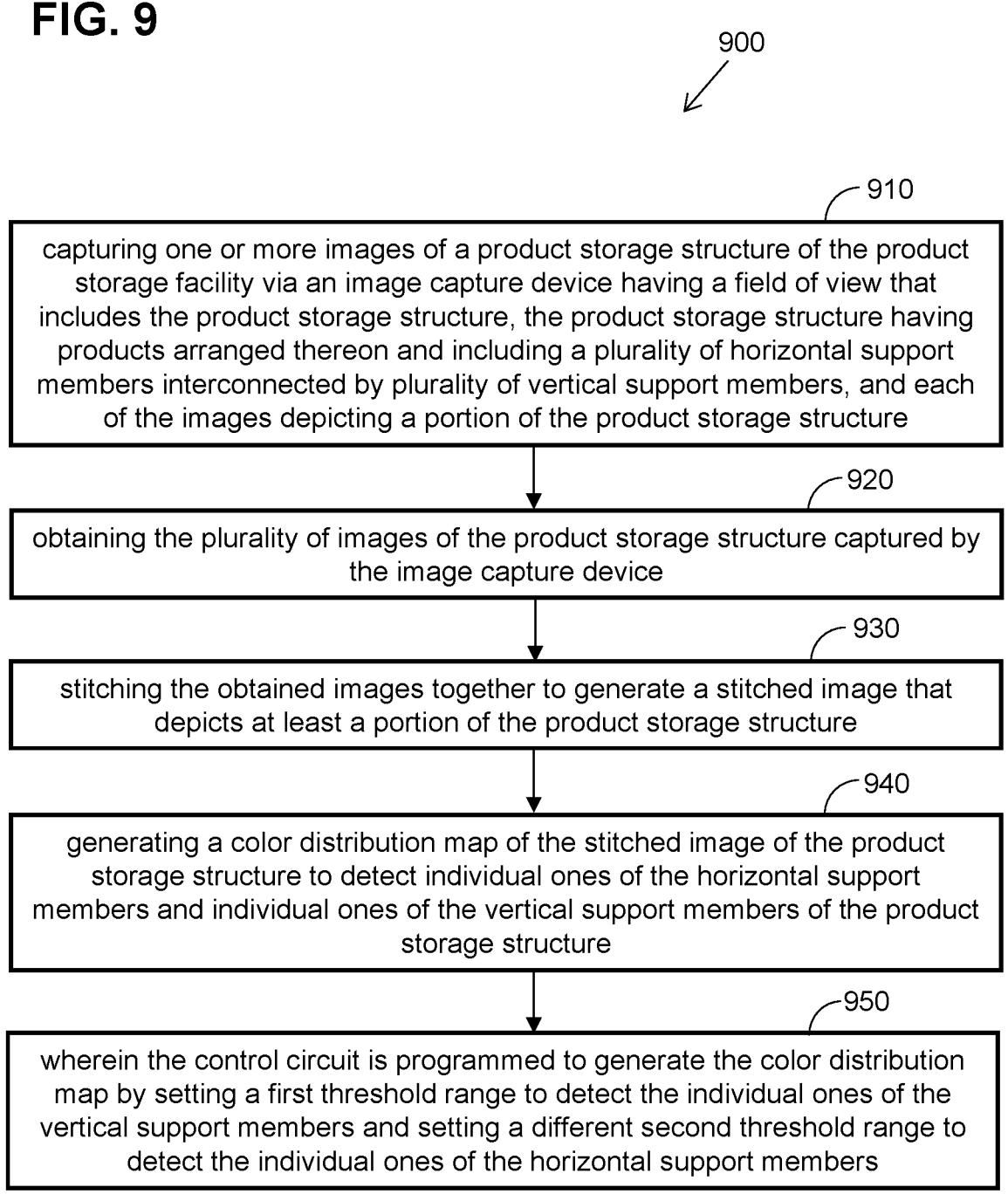

SYSTEMS AND METHODS FOR DETECTING SUPPORT MEMBERS OF PRODUCT STORAGE STRUCTURES AT PRODUCT STORAGE FACILITIES

TECHNICAL FIELD

This disclosure relates generally to managing inventory at product storage facilities, and in particular, to detecting support members of product storage structures at a product storage facility.

BACKGROUND

A typical product storage facility (e.g., a retail store, a product distribution center, a warehouse, etc.) may have hundreds of (if not thousands) of product storage structures that include horizontal shelves that interconnect vertical support posts, with thousands of products stored on the shelves of such product storage structures. It is common for workers of such product storage facilities to visually inspect the product display shelves of the product storage structures to determine and update the on-shelf inventory (e.g., for purposes of restocking the shelves).

Given the very large number of product storage structures at product storage facilities of large retailers, and the even larger number of products stored in the product storage areas, manual inspection and identification/counting of the products on the shelves of the product storage structures at the product storage facility by the workers is very time consuming and labor-intensive, and significantly increases the operations cost for a retailer, since these workers could be performing other tasks if they were not involved in manually inspecting the shelves of the product storage structures at the product storage facility to identify and count the products thereon.

BRIEF DESCRIPTION OF THE DRAWINGS

Disclosed herein are embodiments of systems and methods of detecting support members of product storage structures that store products at a product storage facility. This description includes drawings, wherein:

FIG. 1 is a diagram of an exemplary system of detecting support members of product storage structures that store products at a product storage facility in accordance with some embodiments, depicting a front view of a product storage structure including vertical support members and horizontal support members storing various products thereon, the product storage structure being monitored by an image capture device that is configured to move about the product storage facility;

FIG. 4A is a diagram of a first exemplary image of a first portion of the product storage structure of FIG. 1 taken by the image capture device of FIG. 1, when the image capture device is at a first location relative to the product storage structure during the movement of the image capture device about the product storage area of the product storage facility;

FIG. 4B is a diagram of a second exemplary image of a second portion of the product storage structure of FIG. 1 taken by the image capture device of FIG. 1, when the image capture device is at a second location relative to the product storage structure during the movement of the image capture device about the product storage area of the product storage facility;

FIG. 9 is a flow diagram of an exemplary process of detecting support members of product storage structures that store products at a product storage facility in accordance with some embodiments.

Figure 2:
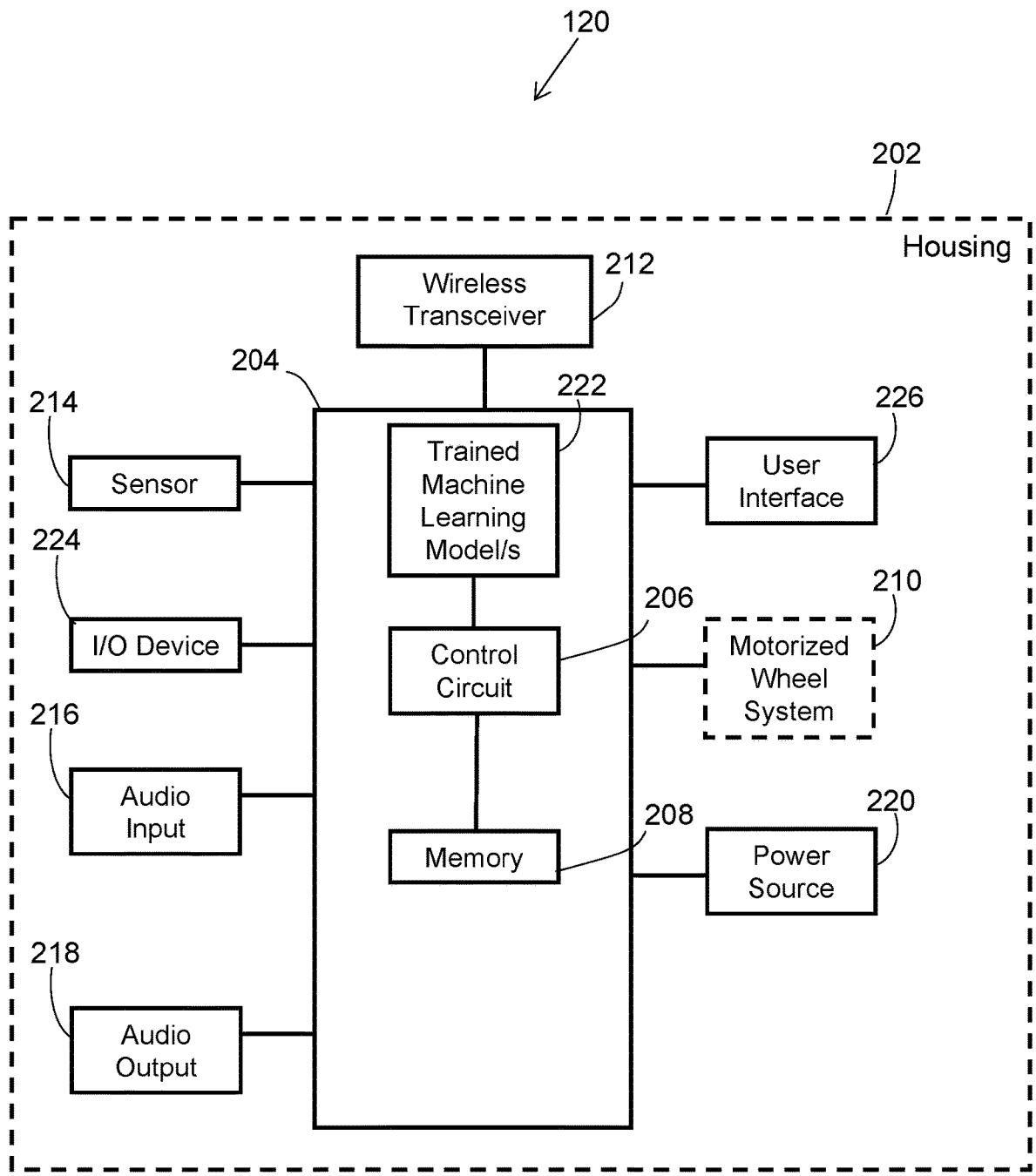
FIG. 2 is a block diagram of an exemplary image capture device in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods of detecting support members of product storage structures that store products at a product storage facility include an image capture device configured to capture a plurality of images of a product storage structure that includes a plurality of vertical support members and a plurality of horizontal support members interconnecting the vertical support members and storing products thereon. The systems and methods further include a computing device including a control circuit configured to: obtain the plurality of images of the product storage structure captured by the image capture device, stitch the obtained images together to generate a stitched image that depicts at least a portion of the product storage structure, generate a color distribution map of the stitched image of the product storage structure to detect individual ones of the horizontal support members and individual ones of the vertical support members of the product storage structure, and generate a data set in association with the stitched image of the product storage structure, the data set representing positional coordinates of the individual ones of the detected vertical support members of the product storage structure and positional coordinates of the individual ones of the detected horizontal support members of the product storage structure.

In some embodiments, a system for detecting support members of product storage structures at a product storage facility includes an image capture device having a field of view that includes at least a part of a product storage structure at the product storage facility having the products arranged thereon. The image capture device is configured to capture a plurality of images of the product storage structure, each of the images depicting a portion of the product storage structure. The product storage structure includes a plurality of horizontal support members interconnected by plurality of vertical support members. The system further includes a computing device including a control circuit, the computing device being communicatively coupled to the image capture device, the control circuit being configured to: obtain the plurality of images of the product storage structure captured by the image capture device; stitch the obtained images together to generate a stitched image that depicts at least a portion of the product storage structure; generate a color distribution map of the stitched image of the product storage structure to detect individual ones of the horizontal support members and vertical support members of the product storage structure. The control circuit is programmed to generate the color distribution map by setting a first threshold range to detect the individual ones of the vertical support members and setting a different second threshold range to detect the individual ones of the horizontal support members.

In some embodiments, a method of detecting support members of product storage structures at a product storage facility includes capturing one or more images of a product storage structure of the product storage facility via an image capture device having a field of view that includes the product storage structure, the product storage structure having products arranged thereon and including a plurality of horizontal support members interconnected by plurality of vertical support members, and each of the images depicting a portion of the product storage structure. The method further includes, by a computing device including a control circuit and communicatively coupled to the image capture device: obtaining the plurality of images of the product storage structure captured by the image capture device; stitching the obtained images together to generate a stitched image that depicts at least a portion of the product storage structure; and generating a color distribution map of the stitched image of the product storage structure to detect individual ones of the horizontal support members and individual ones of the vertical support members of the product storage structure, wherein the control circuit is programmed to generate the color distribution map by setting a first threshold range to detect the individual ones of the vertical support members and setting a different second threshold range to detect the individual ones of the horizontal support members.

FIG. 1 shows an embodiment of a system 100 of detecting support members 117a-117b and 119a-119b of product storage structures 115 that are located in product storage areas 110 of a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that the system 100 may include multiple movable image capture devices 120 located throughout the product storage facility 105 that monitor hundreds of product storage areas 110 of and thousands of product storage structures 115.

It is understood that the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Also, while the exemplary product storage structure 115 shown in FIG. 1 incudes two horizontal support members 119a, 119b, and the products 190d-190f are stored on pallets instead of a horizontal support member of the product storage structure 115, it will be appreciated that, in some embodiments, the product storage structure 115 may include a third horizontal support member akin to the horizontal support members 119a, 119b, and the products 190d-190f may be stored on the third horizontal support member instead of pallets.

Notably, the term "product storage structure" as used herein generally refers to a structure on which products 190a-190f are stored, and may include a pallet, a shelf cabinet, a single shelf, table, rack, refrigerator, freezer, displays, bins, gondola, case, countertop, or another product display. Likewise, it will be appreciated that the number of individual products 190a-190f representing six individual units of each of six different exemplary products (generically labeled as "Brand 1," "Brand 2," "Brand 3," "Brand 4," Brand 5," and "Brand 6") is chosen for simplicity and by way of example only, and that the product storage structure 115 may store more or less than six units of each of the products 190a-190f. Further, the size and shape of the products 190a-190f in FIG. 1 have been shown by way of example only, and it will be appreciated that the individual products 190a-190f may have various sizes and shapes.

Notably, the term "products" may refer to individual products 190a-190f (some of which may be single-piece/single-component products and some of which may be multi-piece/multi-component products), as well as to packages or containers of products 190a-190f, which may be plastic- or paper-based packaging that includes multiple units of a given product 190a-190f (e.g., a plastic wrap that includes 36 rolls of identical paper towels, a paper box that includes 10 packs of identical diapers, etc.). Alternatively, the packaging of the individual products 190a-190f may be a plastic- or paper-based container that encloses one individual product 190a-190f (e.g., a box of cereal, a bottle of shampoo, etc.).

Notably, while the product labels 192a-192f may be referred to herein as "on-shelf product labels" or "on-shelf price tag labels," it will be appreciated that the product labels 192a-192f do not necessarily have to be affixed to horizontal support members 119a or 119b (which may be shelves, etc.) of the product support structure 115 as shown in FIG. 1 and may be located in a different location (e.g., on the vertical support members 117a-117b (which may be support posts interconnecting the shelves). In addition, it will be understood that the product labels 192a-192f may be on-shelf labels containing product information and/or on-shelf price tag labels, and/or on-product price tag labels, etc.

The image capture device 120 (also referred to as an image capture unit or a motorized robotic unit) of the exemplary system 100 depicted in FIG. 1 may be configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 may be configured as a robotic device that moves without being physically operated/manipulated by a human operator (as described in more detail below). In other embodiments, the image capture device 120 may be configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which may be independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet based/cloud-based service module) may be configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, vertical and horizontal support member positional coordinate database, cropped images database, stitched images database, pricing database, customer database, vendor database, manufacturer database, etc.) and may be configured to store various raw and processed images (e.g., 180, 182, 184, 186, 187, 188) of the product storage structure 115 captured by the image capture device 120 while the image capture device 120 may be moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

FIG. 2 presents a more detailed example of an exemplary motorized robotic image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 may be configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that may be coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 may be separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 may be configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, in some implementations, the control circuit 206 may be trained to use the as-projective-as-possible (APAP) image stitching with direct linear transformation (DLT) algorithm and/or boundary-extending Laplacian blending to process one or more of the raw images 180*a*-180*d* depicting portions of the product storage structure 115 at the product storage facility 105 and generate a stitched image 182 that depicts at least a portion of the product storage structure 115. It is understood that the terms "stitching" or "stitched" as used herein with respect to the images 180*a*-180*d* generally mean merging or combining multiple images 180*a*-180*d* together to generate a merged or combined image. In addition, the term "stitching" as used herein is not limited to a specific way of merging the images 180*a*-180*d* and may refer to merging the images 180*a*-180*d* into one image such that the edges of the adjacent images 180*a*-180*d* coincide, adjoin, or are spaced from one another, or such that portions of the adjacent images 180*a*-180*d* overlap one another.

In some implementations, the control circuit 206 may be trained to detect and/or recognize one or more products 190*a*-190*f* using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180*a*-180*d*, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 may be a motorized robotic device capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
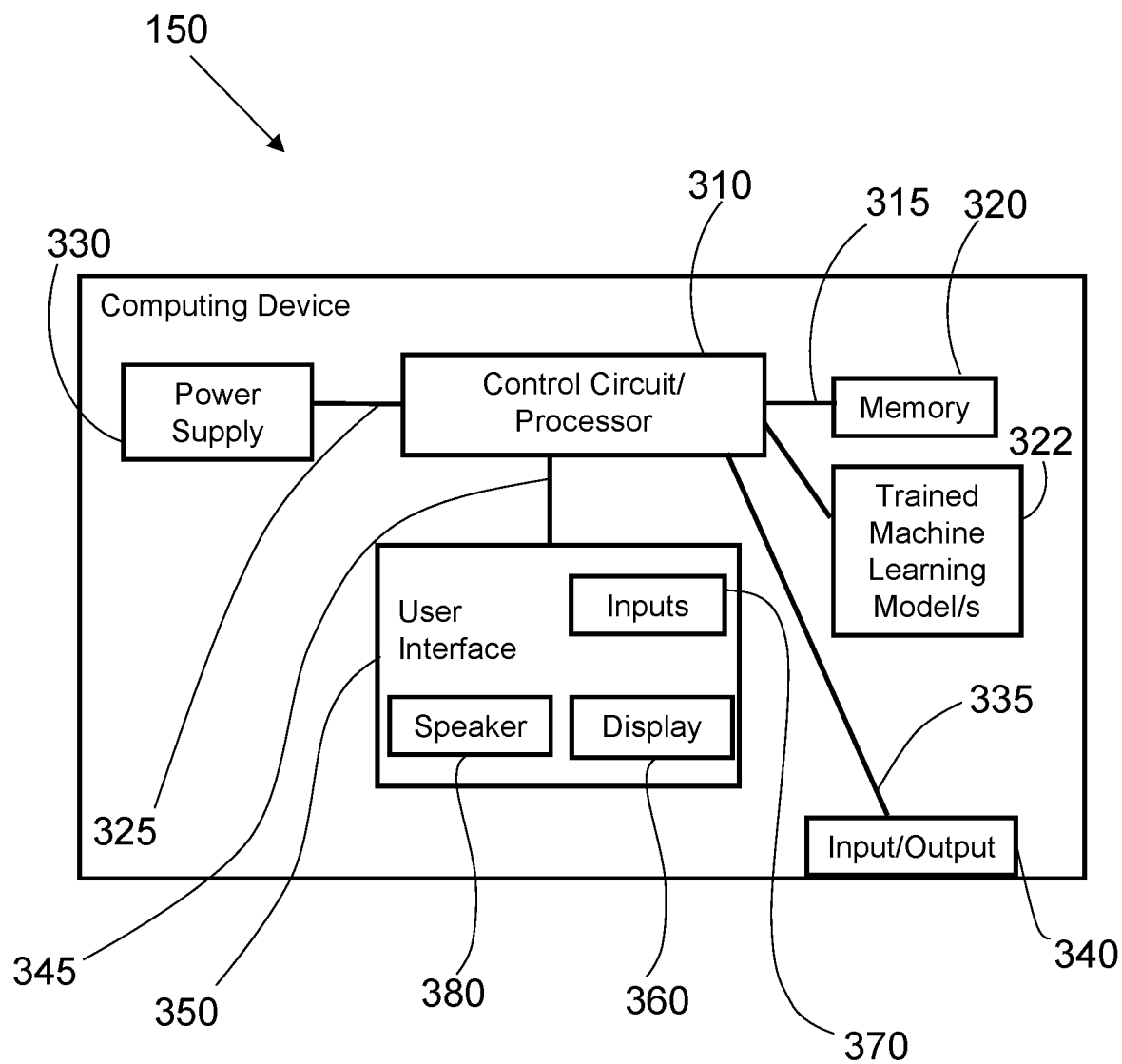
FIG. 3 is a functional block diagram of an exemplary computing device in accordance with some embodiments.
Figure 4C:
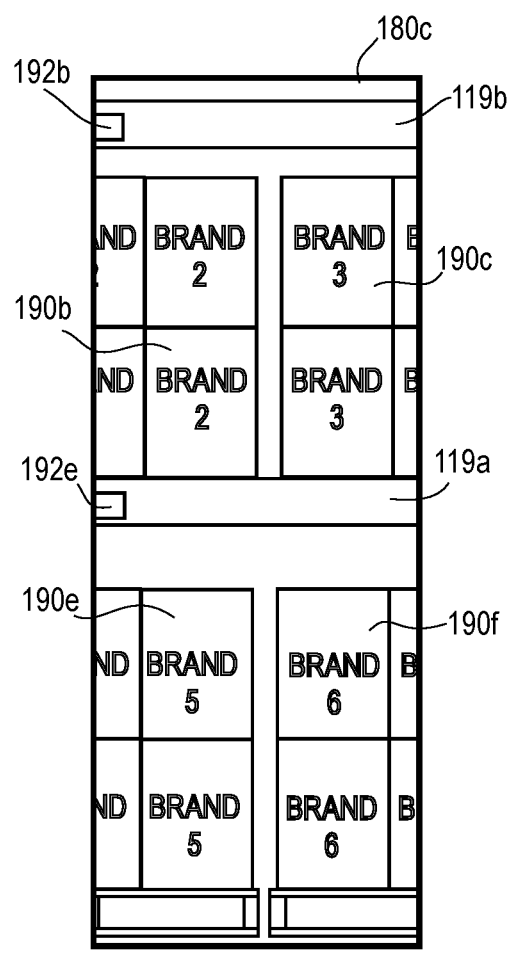
FIG. 4C is a diagram of a third exemplary image of a third portion of the product storage structure of FIG. 1 taken by the image capture device of FIG. 1, when the image capture device is at a third location relative to the product storage structure during the movement of the image capture device about the product storage area of the product storage facility.
Figure 4D:
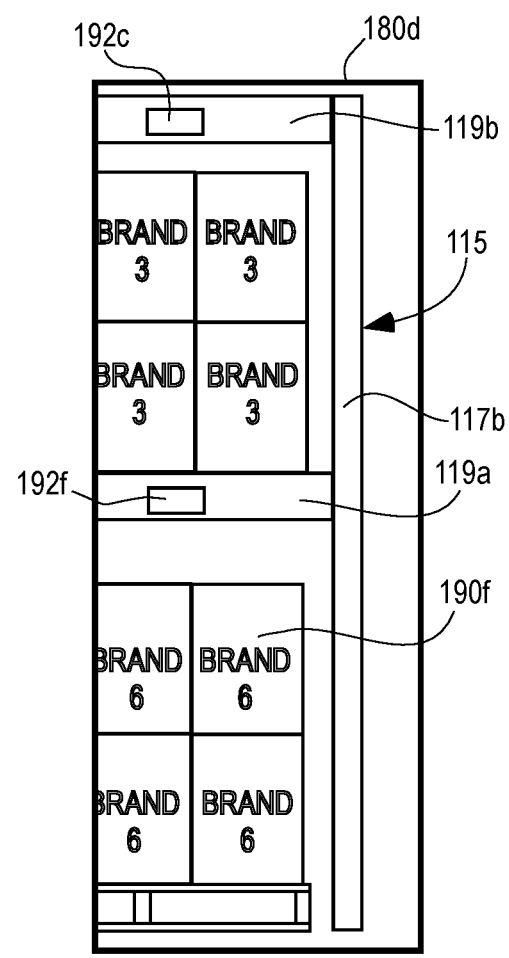
FIG. 4D is a diagram of a fourth exemplary image of a fourth portion of the product storage structure of FIG. 1 taken by the image capture device of FIG. 1, when the image capture device is at a fourth location relative to the product storage structure during the movement of the image capture device about the product storage area of the product storage facility.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and may be configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))).

Accordingly, the memory and/or the control unit may be referred to as a non-transitory medium or non-transitory computer readable medium.

Figure 5:
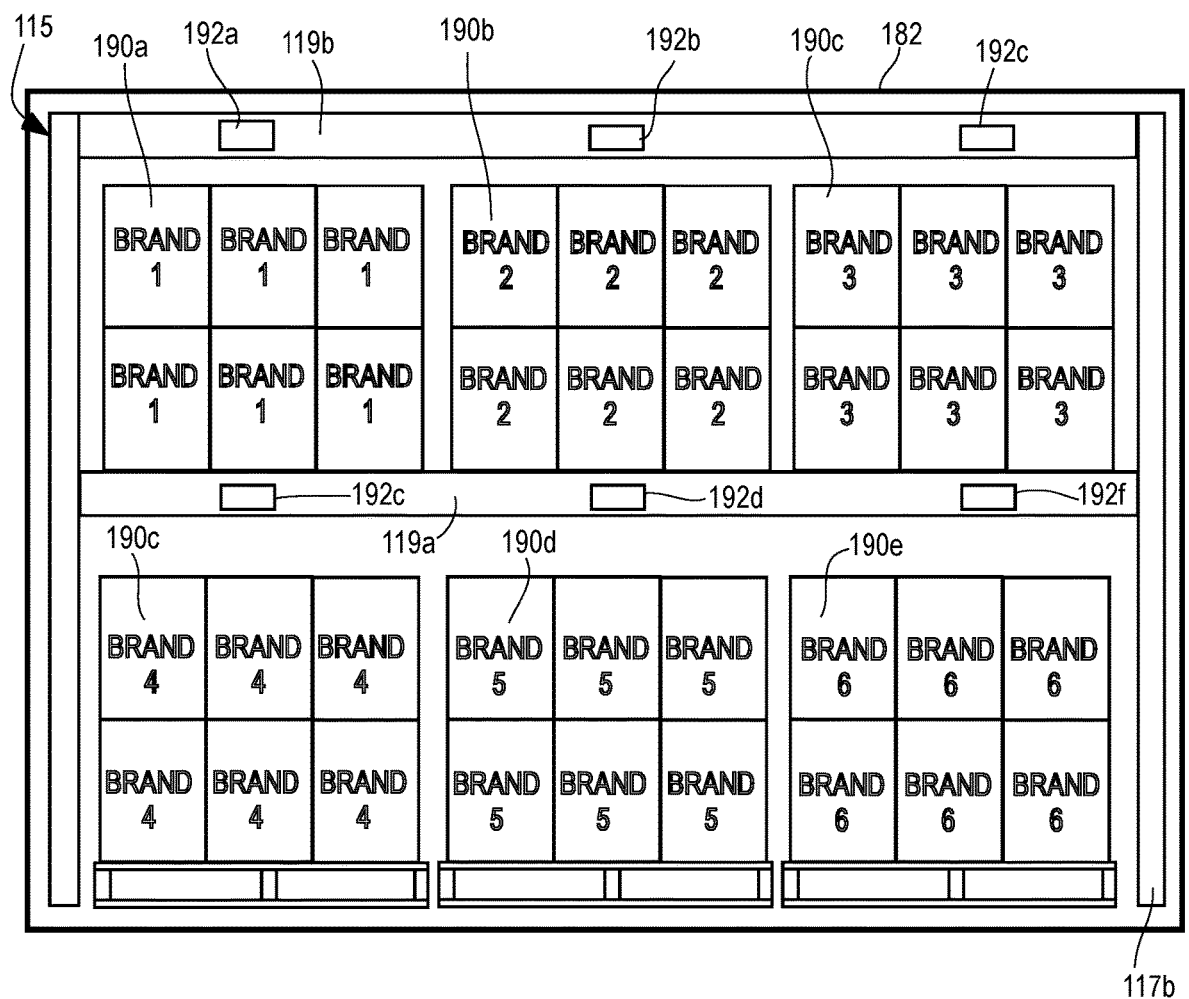
FIG. 5 is a diagram of the exemplary image of FIG. 4, after the image is processed to stitch together the individual images of FIGS. 4A-4D and generate a stitched image.

The control circuit 310 of the computing device 150 may be also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the individual products 190a-190f stocked thereon). The input/output 340 of the computing device 150 can also send signals to other devices, for example, a signal to the electronic database 140 including raw images 180a-180d of portions of the product storage structure 115 (as shown in FIGS. 4A-4D), or a processed stitched image 182 fully depicting the product storage structure 115 (as shown in FIG. 5), or a processed image 184 of the product storage structure 115 depicting a color distribution map 183 (e.g., a binary color distribution map) of the stitched image 182 (shown in FIG. 6), or a processed image 186 of the product storage structure 115 depicting a largest connected objects map of the stitched image 182 (shown in FIG. 7), or a processed image 188 of the product storage structure 115 that includes data representing positional coordinates of the individual vertical support members 117a-117b and horizontal support members 117a-117b of the product storage structure 115 (as shown in FIG. 8). Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 may be electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or restock a given product storage structure 115 based on analysis by the computing device 150 of the images 180a-180d of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 may be not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120, or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images 180a-180d (see FIGS. 4A-4D) of portions of the product storage area 110 and portions of the product storage structure 115 from various angles. In certain aspects, the image capture device 120 may be configured to move about the product storage area 110 while capturing one or more images 180a-180d of the product storage structure 115 at certain predetermined time intervals (e.g., every 1 second, 5 seconds, 10 seconds, etc.). The images 180a-180d captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more raw or processed images 180a-180d of the product storage area 110 captured by the image capture device 120 while moving about the product storage area 110. In particular, in some aspects, the control circuit 310 of the computing device 150 may be programmed to process a raw image 180a-180d (captured by the image capture device 120 and obtained by the computing device 150 from the electronic database 140 or from the image capture device 120) to stitch the obtained images 180a-180d together to generate a stitched image 182 (see FIG. 5) that fully depicts the product storage structure 115. In certain implementations, the images 180a-180d captured by the image capture device 120 may be processed via web-/cloud-based image processing service 170, which may be installed on the computing device 150 (or communicatively coupled to the computing device 150) and executed by the control circuit 310.

In one embodiment, the control circuit 310 may be programmed to analyze the raw images 180a-180d depicted in FIGS. 4A-4D to determine which pairs of the raw images 180a-180d have overlapping fields of view, which enables the control circuit 310 to determine which of the pairs of the raw images 180a-180d depict adjacent portions of the product storage structure 115, which also identifies the pairs of the images 180a-180d, where the second image of the pair was captured by the image capture device 120 immediately after the image capture device 120 captures the first image of the pair. In one aspect, each of the raw images 180a-180d has a time stamp, and the control circuit 310 may be programmed to analyze the time stamps of the raw images 180a-180d to determine which of the raw images 180a-180d were taken one immediately after another, which also identifies which of the pairs of the raw images 180a-180d depict adjacent portions of the product storage structure 115.

In some embodiments, the control circuit 310 may be communicatively coupled to one or more trained computer vision/machine learning/neural network modules/models 322 to perform at some of the functions. For example, in some implementations, the control circuit 310 may be trained to use the as-projective-as-possible (APAP) image stitching with direct linear transformation (DLT) algorithm and/or boundary-extending Laplacian blending to process one or more of the raw images 180a-180d depicting portions of the product storage structure 115 at the product storage facility 105 and generate a stitched image 182 that fully depicts the product storage structure 115 using the as-projective-as-possible (APAP) image stitching with direct linear transformation (DLT) algorithm.

Without wishing to be limited to theory, the use of APAP image stitching with DLT transforms a projective warp into a weighted singular value decomposition (SVD) problem, thereby obtaining better local interpolation results, as well as global projectivity. For example, when analyzed using a 1D analogy of image stitching with a set of 1D correspondences generated by projecting a 2D point cloud onto two 1D image "planes," a projective warp is generally unable to model the local deviations of the data, and these deviations are caused by the inadequacy of the model, since there is generally no noise in the data, a as-affine-as-possible warp is generally able to interpolate the local deviations better, but fails to impose global projectivity, causing incorrect extrapolation in image regions without correspondences, while the as-projective-as-possible (APAP) warp as used by the control circuit 310 of the computing device 150 generally interpolates the local deviations flexibly and extrapolates correctly following a global projective trend.

In addition, the use of APAP image stitching with DLT seamlessly bridges the transitional regions of the adjacent area-depicting images (e.g., 180*a*-180*b*, 180*b*-180*c*, 180*c*-180*d*) that are stitched together, while providing highly accurate image stitching having significantly reduced ghosting effects. Again, without wishing to be limited by theory, while typical linear blending of adjacent images may result in ghosting effects and/or distortion in the area where the adjacent images are stitched, and while typical Laplacian blending may result in an artifact in the form of a dark vertical line in the area where the adjacent images are stitched, the boundary-extending Laplacian blending algorithm programmed into the control circuit 310 applies symmetric boundary extension and gaussian blur kernel on masks, thereby resulting in a visually superior and smoother stitching result, which is represented by the exemplary stitched image 182 shown in FIG. 5.

After the stitched image 182 of FIG. 5 is generated, in some aspects, the control circuit 310 may be programmed to process the stitched image 182 to generate a color distribution map 183 (e.g., a binary color distribution map) of the stitched image 182 of the product storage structure 115 (see FIG. 6) to facilitate the detection of the individual ones of the horizontal support members 119*a*-119*b* of the product storage structure 115 and the individual ones of the vertical support members 117*a*-117*b* of the product storage structure 115. In one embodiment, the binary color distribution map 183 of the stitched image 182 is generated by the control circuit 310 by assigning binary colors to the identified pixels of the stitched image 182.

Since the exemplary product storage structure 115 depicted in the stitched image 182 of FIG. 5 has six different products 190*a*-190*f* (which can have various colors on its packaging) stored thereon, and since the product storage structure 115 has two vertical support members 117*a*-117*b* and two horizontal support members 119*a*-119*b* (which may have the same color, or which may be of different colors), in some embodiments, the control circuit 310 is programmed to generate the binary color distribution map 183 based on the known colors of the vertical support members 117*a*-117*b* and horizontal support members 119*a*-119*b* of the product storage structure 115. For example, in an embodiment, where the vertical support members 117*a*-117*b* of the product storage structure 115 have a first color (for example, grey), and the horizontal support members 119*a*-119*b* of the product storage structure 115 have a second color (for example, red) that is different from the first color, the control circuit 310 is programmed to generate the binary color distribution map 183 as shown in FIG. 6 by setting a first threshold range (e.g., a binary threshold range) to detect the color of the vertical support members 117*a*-117*b* (but not the color of the horizontal support members 119*a*-119*b*), and setting a different second threshold range (e.g., a binary threshold range) to detect the color of the horizontal support members 119*a*-119*b* (but not the color of the vertical support members 117*a*-117*b*).

In one example noted above, the vertical support members 117*a*-117*b* of the product storage structure 115 are grey in color and the horizontal support members 119*a*-119*b* of the product storage structure 115 are red in color. In this example, to detect the grey vertical support members 117*a*-117*b* of the product storage structure 115, the control circuit 310 may be programmed to set the second binary threshold range to be from 0.55 to 0.75 for each of the red channel, the blue channel, and the green channel, which results in most of the grey objects detected within the stitched image 182 to be marked on the binary color distribution map 183. On the other hand, to detect the red horizontal support members 117*a*-117*b* of the product storage structure 115, the control circuit 310 may be programmed to set the first binary threshold range to be from 0.3 to 0.75 for red channel and negative ranges for blue channel and green channel, resulting in the processed image 186 of FIG. 6 depicting the exemplary binary color distribution map 183, which results in most of the red objects detected within the stitched image 182 to be marked on the binary color distribution map 183. It will be understood that, if the vertical support members 117*a*-117*b* were of any color alternative to grey, the control circuit 310 would set a threshold range (e.g., a binary threshold range) that has values that are specific to detecting the alternative color of the vertical support members 117*a*-117*b*. By the same token, if the horizontal vertical support members 117*a*-117*b* were of any color alternative to red, the control circuit 310 would set a threshold range that has values specific to detecting the alternative color of the horizontal support members 119*a*-119*b*.

Figure 6:
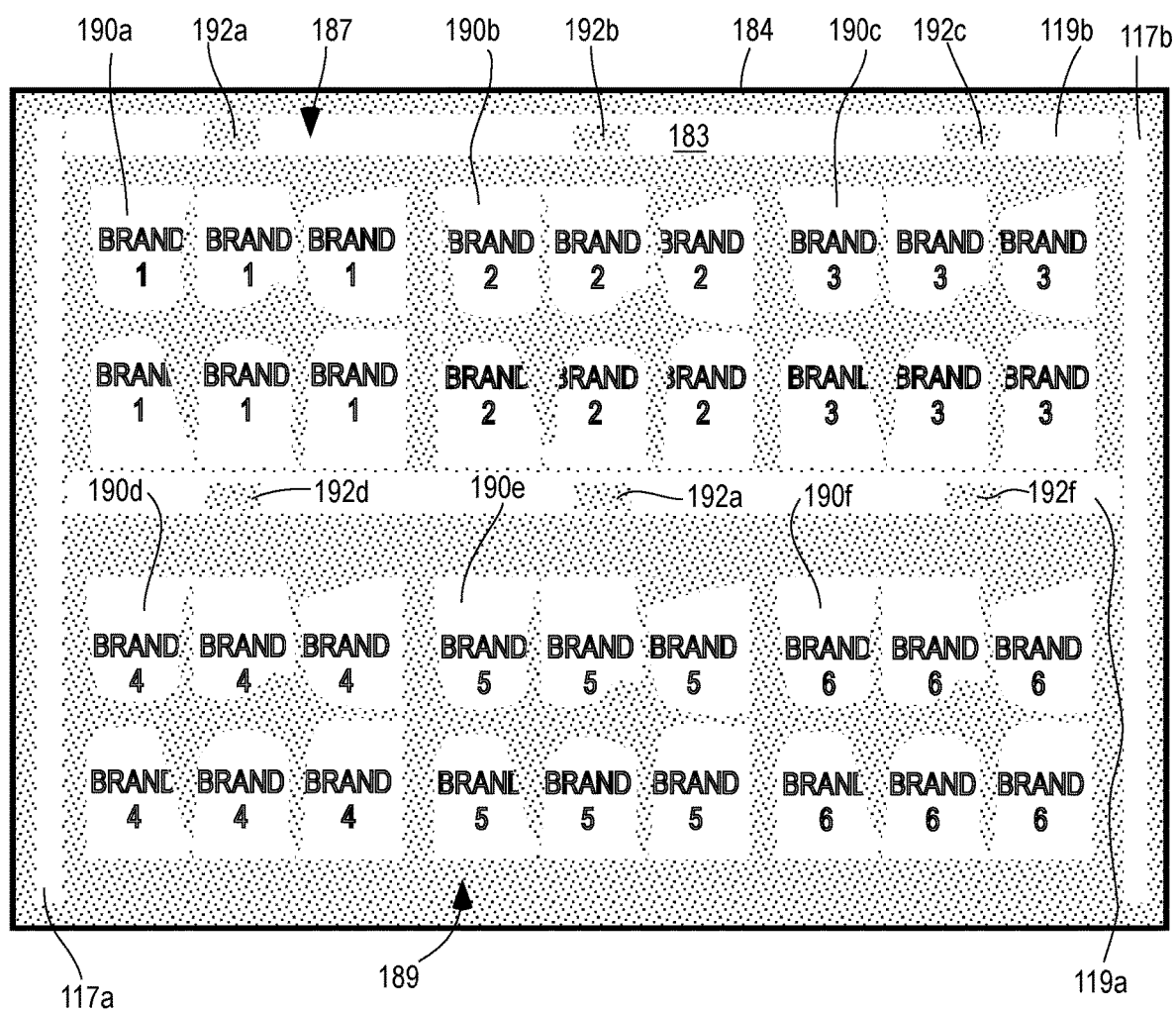
FIG. 6 is a diagram of the exemplary stitched image of FIG. 5, after the image is processed to generate a color distribution map of the stitched image to facilitate detection of the individual horizontal and vertical support members of the product storage structure.

With reference to FIG. 6, the exemplary binary color distribution map 183 marks (with light areas 187) the grey vertical support members 117*a*-117*b*, the red horizontal support members 119*a*-119*b* of the product storage structure 115, as well as the grey and red areas of the packaging of the products 190*a*-190*f* stored on the product storage structure 115. In addition, the exemplary binary color distribution map 183 marks (with dark areas 189) the spaces surrounding the product storage structure 115, the spaces between the products 190*a*-190*f*, and the areas of the packaging of the products 190*a*-190*f* that are not red or grey. Notably, while the exemplary binary color distribution map 183 of FIG. 6 marks some areas of the packaging of the products 190*a*-190*f* with light areas 187, if none of the products 190*a*-190*f* had packaging containing grey or red areas, none of the products 190*a*-190*f* would be marked with light areas 187, and would instead all be marked with dark areas 189.

In some embodiments, the control circuit 310 of the computing device 150 is programmed to analyze the binary color distribution map 183 to detect the vertical support members 117*a*-117*b* of the product storage structure 115, to detect the horizontal support members 119*a*-119*b* of the product storage structure 115, and to detect the products 190*a*-190*f* on the product storage structure 115. In one implementation, the control circuit 310 of the computing device 150 is programmed to process the image 186 depicting the binary color distribution map 183 as shown in FIG. 6 via a scan array union find (SAUF) algorithm to detect largest connected objects on the binary color distribution map 183. In the exemplary binary color distribution map 183 of FIG. 6, the largest connected objects represent the individual ones of the vertical support members 117a-117b and the individual ones of the horizontal support members 119a-119b.

Without wishing to be limited to theory, SAUF is a fast two-pass connected-component labeling algorithm, which is used for detecting the connected components in binary digital images. In one embodiment, the implementation of SAUF by the control circuit 310 to analyze the binary color distribution map 183 and detect the individual ones of the vertical support members 117a-117b and the individual ones of the horizontal support members 119a-119b proceeds as follows. First, the control circuit 310 scans the image 186 containing the binary color distribution map 183 and creates a connection table such that each pixel receives the smallest provisional label of its neighbor pixels, and uses the decision tree to minimize the number of neighbors examined during the scanning phase. Then, the control circuit 310 applies a union-find algorithm to minimize the computational complexities and manage the label equivalence information. Thereafter, the SAUF algorithm applied by the control circuit 310 only requires a relatively small amount of random memory to detect the connected components in the binary color distribution map 183 and thus distinguish the vertical support members 117a-117b and horizontal support members 119a-119b of the product storage structure 115 from the products 190a-190f stored on the product storage structure 115.

In one embodiment, the control circuit 310 of the computing device 150 is programmed to select the largest connected object (e.g., one of the horizontal support members 119a-119b) and apply the SAUF algorithm for 8-way connectivity based on a decision tree structure for scanning the 8-connected neighbors. Then, the control circuit 310 may be programmed to re-rank a predetermined number of the top 5 (or top 3, or top 7, etc.) connected contour areas, and filter out the false positives by applying predetermined business rules that are programmed into the control circuit 310 and that are set based on the known dimensions of the vertical support members 117a-117b, the horizontal support members 119a-119b, and the products 190a-190f. One exemplary business rule programmed into the control circuit 310 during SAUF analysis of the binary color distribution map 183 may be that for each of the horizontal support members 119a-119b, the width is greater than the height. Another exemplary business rule programmed into the control circuit 310 during the SAUF analysis of the binary color distribution map 183 may be that the contour area of a horizontal support member 119a or 119b takes up ¼ percentage of the resolution of the image 186. Yet another exemplary business rule programmed into the control circuit 310 during SAUF analysis of the binary color distribution map 183 may be that for each of the vertical support members 117a-117b, the height is greater than the width.

Figure 7:
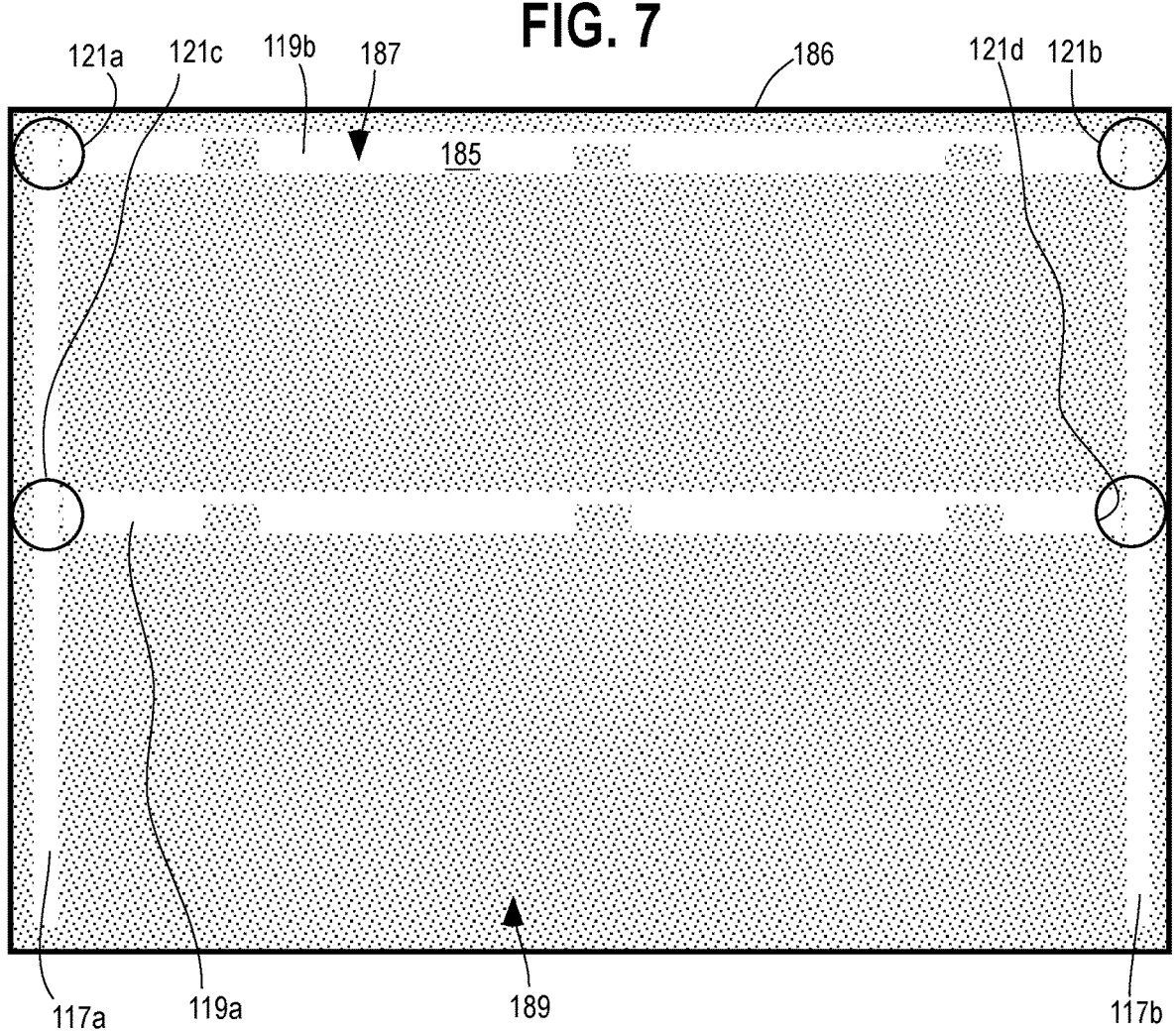
FIG. 7 is a diagram of the exemplary stitched image of FIG. 5, after the image is processed to generate a largest connected objects map of the stitched image to facilitate detection of the individual horizontal and vertical support members of the product storage structure.
Figure 8:
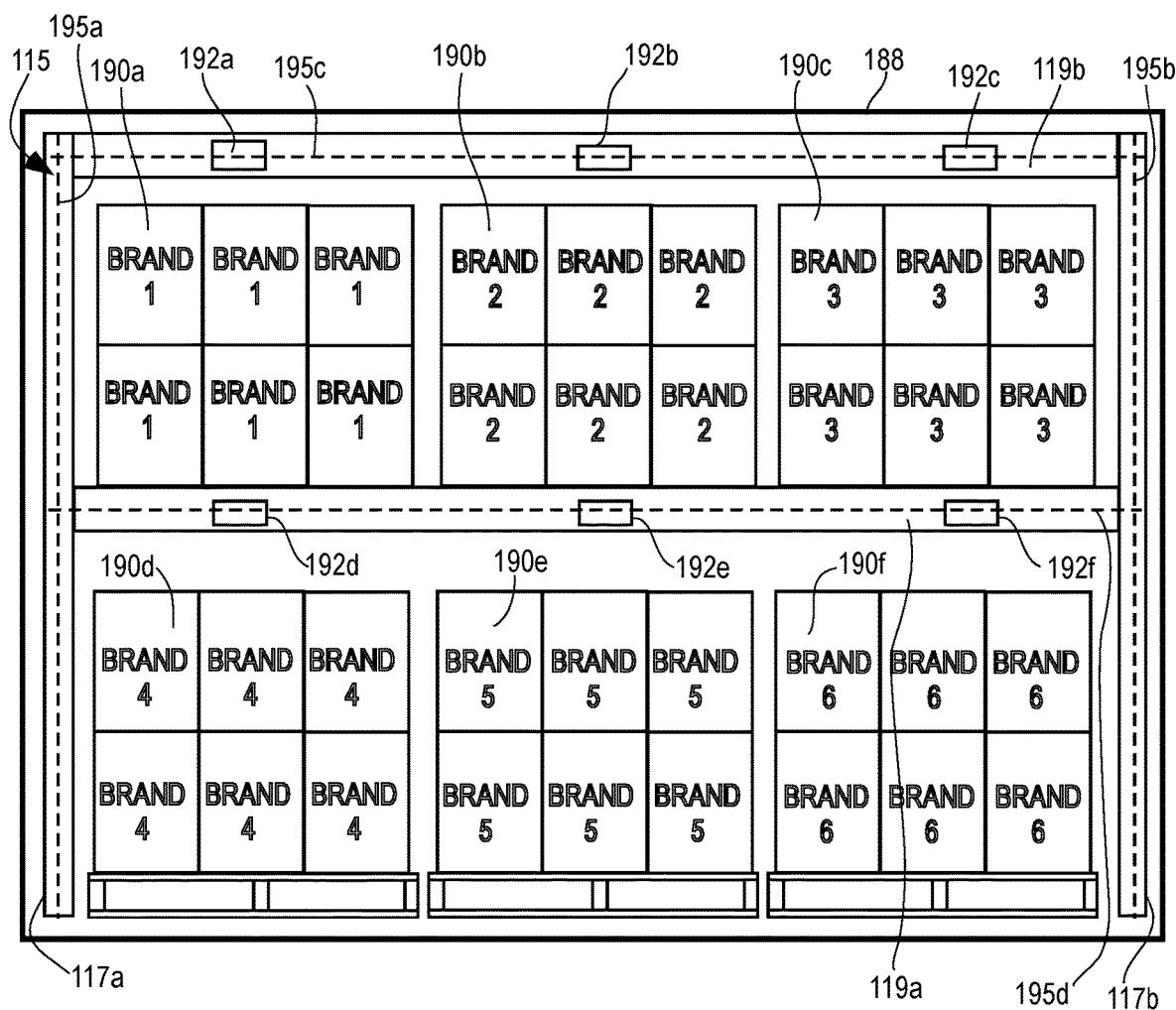
FIG. 8 is a diagram of the exemplary stitched image of FIG. 5, after the image is processed to include data representing positional coordinates of the individual vertical and horizontal support members of the product storage structure.

In certain implementations, the processing of the image 186 and the analysis of the binary color distribution map 183 by the control circuit 310 via the SAUF algorithm as described above results in an image 188 depicting a ranked largest connection map 185, as shown in FIG. 7. One difference between the binary color distribution map 183 of the image 186 of FIG. 6, and the ranked largest connection map 185 of the image 188 in FIG. 7 is that the binary color distribution map 183 of the image 186 of FIG. 6 marks with light areas 187 the grey vertical support members 117a-117b, the red horizontal support members 119a-119b, and the red and grey portions of the packaging of the products 190a-190f (marking the remaining portions of the image 186 with dark areas 189), while the ranked largest connection map 185 of the image 186 of FIG. 7 marks with light areas 187 only the grey vertical support members 117a-117b and the red horizontal support members 119a-119b (marking the remaining portions of the image 188, including the red and grey portions of the packaging of the products 190a-190f, with dark areas 189). In other words, FIGS. 6 and 7 show that the exemplary ranked largest connection map 185 is more focused than the binary color distribution map 183 with respect to identifying the contours of only the largest connected objects, i.e., the vertical support members 117a-117b and the horizontal support members 119a-119b of the product storage structure 115.

In some embodiments, after the control circuit 310 uses the SAUF algorithm to analyze the binary color distribution map 183 and detects the vertical support members 117a-117b and the horizontal support members 119a-119b of the product storage structure 115 and generates the ranked largest connection map 185 as described above, the control circuit 310 is programmed to determine respective centroid points of the individual ones of each of the vertical support members 117a-117b and each of the horizontal support members 119a-119b. Then, based on the determined centroid points of each of the vertical support members 117a-117b and each of the horizontal support members 119a-119b, the control circuit 310 may be programmed to calculate a positional coordinate of each intersection of a vertical support member 117a, 117b with a horizontal support member 119a, 119b. In the exemplary image 188 of FIG. 7, each of the detected intersections is annotated with a circle. In particular, the vertical support member 117a intersect the horizontal support member 119a at an intersection 121a and intersects the horizontal support member 119b at an intersection 121b, while the vertical support member 117b intersect the horizontal support member 119a at an intersection 121c and intersects the horizontal support member 119b at an intersection 121d.

In one embodiment, based on detection of the individual ones of the vertical support members 117a-117b of the product storage structure 115 and the horizontal support members 119a-119b of the product storage structure 115, as well as their respective centroids and their intersections 121a-121d with one another, the control circuit 310 is programmed to determine (e.g., based on (the electronic database 140-stored) known dimensions of vertical support members 117a-117b and horizontal support members 119a-119b of the product storage structure 115) the relative locations of the vertical support members 117a-117b and horizontal support members 119a-119b of the product storage structure 115, and to generate a data set in association with the stitched image 182 of the product storage structure 115 that represents the positional coordinates of the individual ones of the vertical support members 117a-117b of the product storage structure 115 and the positional coordinates of the individual ones of the horizontal support members 119a-119b of the product storage structure 115.

These positional coordinates of each of the vertical support members 117a-117b and horizontal support members 119a-119b of the product storage structure 115 generated by the control circuit 310 are schematically represented by the dashed lines 195a-195d in FIG. 8. In particular, in one embodiment depicted in FIG. 8, the control circuit 310 is programmed to process the stitched image 182 of FIG. 5 to assign the positional coordinates 195*a* to vertical support member 117*a*, the positional coordinates 195*b* to vertical support member 117*b*, the positional coordinates 195*c* to horizontal support member 119*a*, and the positional coordinates 195*d* to horizontal support member 119*b*. As such, the above-described processing of the stitched image 182 by the control circuit 310 results in the generation of positional coordinates 195*a*-195*d* for each of the vertical support members 117*a*-117*b* and horizontal support members 119*a*-119*b* of the product storage structure 115. In one embodiment, after the control circuit 310 generates the positional coordinates 195*a*-195*d* for each of the vertical support members 117*a*-117*b* and horizontal support members 119*a*-119*b* of the product storage structure 115, the control circuit 310 is programmed to transmit the positional coordinates 195*a*-195*d* for each of the vertical support members 117*a*-117*b* and horizontal support members 119*a*-119*b* of the product storage structure 115 to the electronic database 140 for storage, such that the electronic database 140 is updated to store the positional coordinates 195*a*-19*d* of each horizontal support member 119*a*-119*b* and each vertical support member 117*a*-117*b* of each product storage structure 115 at the product storage facility 105.

With reference to FIG. 9, an exemplary method 900 of operation of the system 100 for detecting vertical support members 117*a*-117*b* and horizontal support members 119*a*-119*b* of product storage structures 115 that store products 190*a*-190*f* at a product storage facility 105 is described. The exemplary method 900 includes capturing one or more images 180*a*-180*d* (see FIGS. 4A-4D) of portions of a product storage structure 115 in a product storage area 110 of the product storage facility 105 via an image capture device 120 having a field of view that includes the product storage structure 115 (step 910). As shown in FIG. 1, the exemplary product storage structure 115 has products 190*a*-190*f* arranged thereon and includes two horizontal support members 119*a*-119*b* interconnected by two vertical support members 117*a*-117*b*. As pointed out above, in some embodiments, while the image capture device 120 moves about the product storage area 110 of the product storage facility 105, the image capture device 120 captures (in sequence and at predetermined intervals) the images 180*a*-180*d* (FIGS. 4A-4D) of portions of the product storage structure 115 from various angles. As can be seen with reference to FIGS. 4A-4D, certain pairs of the images 180*a*-180*d* (e.g., 180*a*-180*b*, 180*b*-180*c*, 180*c*-180*d*) depict adjacent and/or overlapping portions of the product storage structure 115.

The exemplary method 900 further includes obtaining the raw data images 180*a*-180*d* of the product storage structure 115 captured by the image capture device 120 (step 920) and stitching the obtained raw data images 180*a*-180*d* 1together to generate a stitched image 182 (see FIG. 5) that depicts at least a portion of the product storage structure 115 (step 930). As pointed out above, in some embodiments, the control circuit 310 of the computing device 150 obtains (e.g., from the electronic database 140, or from an image-processing internet-based service 170, or directly from the image capture device 120) one or more raw or processed images 180*a*-180*d* captured by the image capture device 120 and processed the raw images 180*a*-180*d* to stitch the images 180*a*-180*d* together to generate a stitched image 182 that fully depicts the product storage structure 115. As also pointed out above, in some implementations, the control circuit 310 may be trained to use the as-projective-as-possible (APAP) image stitching with direct linear transformation (DLT) algorithm and/or boundary-extending Laplacian blending to process one or more of the raw images 180*a*-180*d* depicting portions of the product storage structure 115 at the product storage facility 105 to generate the stitched image 182 that fully depicts the product storage structure 115.

After the raw data images 180*a*-180*d* of FIGS. 4A-4D captured by the image capture device 120 are obtained by the control circuit 310 in step 920, and after the raw data images 180*a*-180*d* are stitched together by the control circuit 310 to generate the stitched image 182 of FIG. 5 in step 930, the exemplary method 900 further includes generating, by the control circuit 310 of the computing device 150, a color distribution map 183 of the stitched image 182 of the product storage structure 115 to detect individual ones of the horizontal support members 119*a*-119*b* and individual ones of the vertical support members 117*a*-117*b* of the product storage structure 115 (step 940), wherein the control circuit 310 is programmed to generate the color distribution map 310 by setting a first threshold range to detect the individual ones of the vertical support members 117*a*-117*b* and setting a different second threshold range to detect the individual ones of the horizontal support members 119*a*-119*d* (step 950).

As pointed out above, in some embodiments, the vertical support members 117*a*-117*b* of the product storage structure 115 may have a first color (e.g., grey), and the horizontal support members 119*a*-119*b* of the product storage structure 115 may have a second color (e.g., red) that is different from the first color, and the control circuit 310 generates the color distribution map 183 (see FIG. 6) by setting a first binary threshold range to detect the color (i.e., grey) of the vertical support members 117*a*-117*b* (but not the red color of the horizontal support members 119*a*-119*b*), and setting a different second binary threshold range to detect the color (i.e., red) of the horizontal support members 119*a*-119*b* (but not the grey color of the vertical support members 117*a*-117*b*). As also pointed out above, the control circuit 310 of the computing device 150 may be programmed to use a SAUF algorithm to analyze the color distribution map 183 to detect the largest connected objects on the color distribution map 183 and thereby detect the vertical support members 117*a*-117*b* of the product storage structure 115, the horizontal support members 119*a*-119*b* of the product storage structure 115, and the products 190*a*-190*f* on the product storage structure 115. Notably, in some aspects, the processing of the image 186 and the analysis of the color distribution map 183 by the control circuit 310 via the SAUF algorithm as described above results in an image 188 depicting a ranked largest connection map 185, as shown in FIG. 7.

As pointed out above, in some embodiments, the control circuit 310 may analyze the ranked largest connection map 185 (see FIG. 7) above to determine respective centroid points of the individual ones of each of the vertical support members 117*a*-117*b* and each of the horizontal support members 119*a*-119*b*, which then permits the control circuit 310 to calculate a positional coordinate of each of the intersections of a vertical support member 117*a*, 117*b* with a horizontal support member 119*a*, 119*b* (see circles annotated 121*a*-121*d* in FIG. 7). As also noted above, based on the calculation of the centroids and intersections of the horizontal support members 119*a*-119*b* and vertical support members 117*a*-117*b*, the control circuit 310 may use the known dimensions of vertical support members 117*a*-117*b* and horizontal support members 119*a*-119*b* of the product storage structure 115 to determine the relative locations of the vertical support members 117*a*-117*b* and horizontal support members 119*a*-119*b* of the product storage structure 115, and to generate the data representing the positional coordinates of the vertical support members 117a-117b and the horizontal support members 119a-119b of the product storage structure 115 accordingly.

The above-described exemplary embodiments advantageously provide for inventory management systems and methods, where structural features (i.e., horizontal support members and vertical support members) of the product storage structures can be efficiently detected and their physical locations at the product storage facility can be efficiently determined. As such, the systems and methods described herein provide for an efficient and precise inventory management system and provide a significant cost savings to the product storage facility by saving the product storage facility thousands of worker hours that would be normally spent on manual inspection of the thousands of product storage structures at the product storage facility.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No. 17/983,773; entitled SYSTEMS AND METHODS OF USING CACHED IMAGES TO DETERMINE PRODUCT COUNTS ON PRODUCT STORAGE STRUCTURES OF A PRODUCT STORAGE FACILITY filed Jan. 24, 2023, application Ser. No. 18/158,969; entitled METHODS AND SYSTEMS FOR CREATING REFERENCE IMAGE TEMPLATES FOR IDENTIFICATION OF PRODUCTS ON PRODUCT STORAGE STRUCTURES OF A RETAIL FACILITY filed Jan. 24, 2023, application Ser. No. 18/158,983; entitled SYSTEMS AND METHODS FOR PROCESSING IMAGES CAPTURED AT A PRODUCT STORAGE FACILITY filed Jan. 24, 2023, application Ser. No. 18/158,925; and entitled SYSTEMS AND METHODS FOR PROCESSING IMAGES CAPTURED AT A PRODUCT STORAGE FACILITY filed Jan. 24, 2023, application Ser. No. 18/158,950; entitled SYSTEMS AND METHODS FOR ANALYZING AND LABELING IMAGES IN A RETAIL FACILITY filed Jan. 30, 2023, application No. 18/161,788; entitled SYSTEMS AND METHODS FOR ANALYZING DEPTH IN IMAGES OBTAINED IN PRODUCT STORAGE FACILITIES TO DETECT OUTLIER ITEMS filed February 6, 2023, application Ser. No. 18.165,152; entitled SYSTEMS AND METHODS FOR REDUCING FALSE IDENTIFICATIONS OF PRODUCTS filed February 13, 2023, application Ser. No. 18/168,198; entitled SYSTEMS AND METHODS FOR IDENTIFYING DIFFERENT PRODUCT IDENTIFIERS THAT CORRESPOND TO THE SAME PRODUCT filed February 13, 2023, application Ser. No. 18/168,174; SYSTEMS AND METHODS OF UPDATING MODEL TEMPLATES ASSOCIATED WITH IMAGES OF RETAIL PRODUCTS AT PRODUCT STORAGE FACILITIES filed Jan. 30, 2023, application Ser. No. 18/102,999; and entitled SYSTEMS AND METHODS FOR RECOGNIZING PRODUCT LABELS AND PRODUCTS LOCATED ON PRODUCT STORAGE STRUCTURES OF PRODUCT STORAGE FACILITIES, filed January 31, 2023, application No. 18/106,269.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for detecting support members of product storage structures at a product storage facility, the system comprising:
   an image capture device having a field of view that includes at least a part of a product storage structure at the product storage facility having the products arranged thereon,
      wherein the image capture device is configured to capture a plurality of images of the product storage structure, each of the images depicting a portion of the product storage structure; and
      wherein the product storage structure includes a plurality of horizontal support members interconnected by plurality of vertical support members; and
   a computing device including a control circuit, the computing device being communicatively coupled to the image capture device, the control circuit being configured to:
      obtain the plurality of images of the product storage structure captured by the image capture device;
      stitch the obtained images together to generate a stitched image that depicts at least a portion of the product storage structure; and
      generate a color distribution map of the stitched image of the product storage structure, wherein the color distribution map includes setting a first threshold range to detect individual ones of the horizontal support members and setting a second threshold range to detect the individual ones of the vertical support members of the product storage structure.

2. The system of claim 1, wherein the image capture device comprises a motorized robotic unit that includes wheels that permit the motorized robotic unit to move about the product storage facility, and a camera to permit the motorized robotic unit to capture the images of the product storage structure.

3. The system of claim 1, wherein the control circuit is programmed to generate the stitched image by stitching together multiple pairs of the images having overlapping fields of view.

4. The system of claim 3, wherein the control circuit is programmed to use boundary-extending Laplacian blending to stitch together the multiple pairs of the images having the overlapping fields of view to generate the stitched image.

5. The system of claim 1,
   wherein the individual ones of the vertical support members have a first color and the individual ones of the horizontal support members have a second color different from the first color; and wherein the control circuit is programmed to set the first threshold range to detect the first color but not the second color and to set the second threshold range to detect the second color but not the first color.

6. The system of claim 1, wherein the control circuit is programmed to analyze the color distribution map via a scan array union find (SAUF) algorithm to detect largest connected objects, wherein the largest connected objects represent the individual ones of the vertical support members and the individual ones of the horizontal support members.

7. The system of claim 6, wherein, after detection of the largest connected objects representing the individual ones of the vertical support members and the individual ones of the horizontal support members, the control circuit is programmed to determine respective centroid points of the individual ones of the vertical and horizontal support members, and, based on the centroid points, calculate a positional coordinate of each intersection of a vertical support member with a horizontal support member.

8. The system of claim 7, wherein the control circuit is programmed to analyze the calculated positional coordinate of each intersection of a vertical support member with a horizontal support member to calculate a total number of intersection points between the vertical and horizontal support members and, based on the calculated total number of the intersection points, to determine relative locations of the vertical and horizontal support members of the product storage structure.

9. The system of claim 8, wherein, based on a determination of the relative locations of the vertical and horizontal support members of the product storage structure, the control circuit is programmed to generate a data set in association with the stitched image of the product storage structure, the data set representing the positional coordinates of the individual ones of the vertical support members of the product storage structure and the positional coordinates of the individual ones of the horizontal support members of the product storage structure.

10. A method of detecting support members of product storage structures at a product storage facility, the method comprising:

capturing one or more images of a product storage structure of the product storage facility via an image capture device having a field of view that includes the product storage structure, the product storage structure having products arranged thereon and including a plurality of horizontal support members interconnected by plurality of vertical support members, and each of the images depicting a portion of the product storage structure;

by a computing device including a control circuit and communicatively coupled to the image capture device:
obtaining the plurality of images of the product storage structure captured by the image capture device;
stitching the obtained images together to generate a stitched image that depicts at least a portion of the product storage structure; and
generating a color distribution map of the stitched image of the product storage structure, wherein the color distribution map includes setting a first threshold range to detect individual ones of the horizontal support members and setting a second threshold range to detect the individual ones of the vertical support members of the product storage structure.

11. The method of claim 10, wherein the image capture device comprises a motorized robotic unit that includes wheels that permit the motorized robotic unit to move about the product storage facility, and a camera to permit the motorized robotic unit to capture the images of the product storage structure.

12. The method of claim 10, wherein the control circuit is programmed to generate the stitched image by stitching together multiple pairs of the images having overlapping fields of view.

13. The method of claim 12, further comprising, by the control circuit, using boundary-extending Laplacian blending to stitch together the multiple pairs of the images having the overlapping fields of view to generate the stitched image.

14. The method of claim 10,
wherein the individual ones of the vertical support members have a first color and the individual ones of the horizontal support members have a second color different from the first color; and
further comprising, by the control circuit, setting the first threshold range to detect the first color but not the second color and setting the second threshold range to detect the second color but not the first color.

15. The method of claim 10, further comprising, by the control circuit, analyzing the color distribution map via a scan array union find (SAUF) algorithm to detect largest connected objects, wherein the largest connected objects represent the individual ones of the vertical support members and the individual ones of the horizontal support members.

16. The method of claim 15, further comprising, after detection of the largest connected objects representing the individual ones of the vertical support members and the individual ones of the horizontal support members, determining, by the control circuit, respective centroid points of the individual ones of the vertical and horizontal support members, and, based on the centroid points, calculating a positional coordinate of each intersection of a vertical support member with a horizontal support member.

17. The method of claim 16, further comprising, by the control circuit, analyzing the calculated positional coordinate of each intersection of a vertical support member with a horizontal support member to calculate a total number of intersection points between the vertical and horizontal support members and, based on the calculated total number of the intersection points, determining relative locations of the vertical and horizontal support members of the product storage structure.

18. The method of claim 17, further comprising, based on a determination of the relative locations of the vertical and horizontal support members of the product storage structure, generating, by the control circuit, a data set in association with the stitched image of the product storage structure, the data set representing the positional coordinates of the individual ones of the vertical support members of the product storage structure and the positional coordinates of the individual ones of the horizontal support members of the product storage structure.

* * * * *